Figure 1:
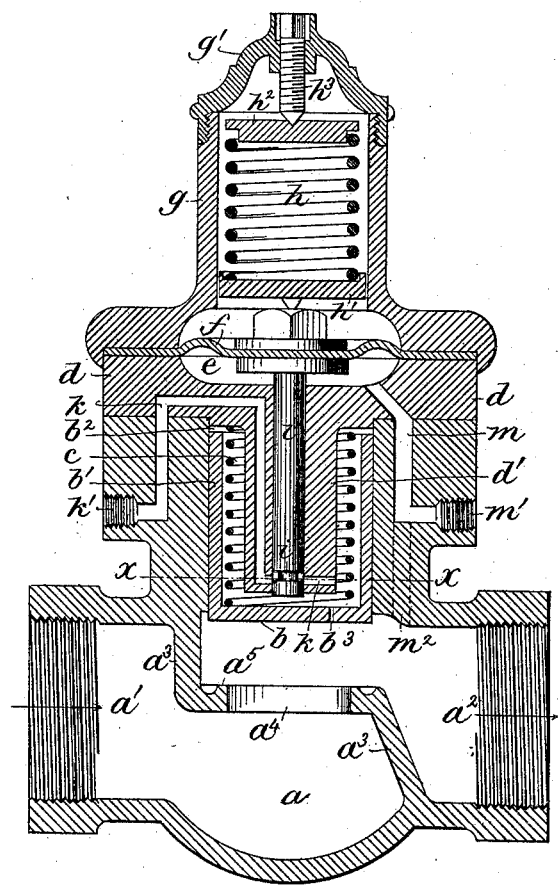

(No Model.)

W. B. MASON.
FLUID PRESSURE REGULATOR.

No. 383,426.  Patented May 22, 1888.

Witnesses,
Jas J. Maloney.
H. P. Bates.

Inventor,
William B. Mason,
by Jos. P. Livermore,
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

FLUID-PRESSURE REGULATOR.

SPECIFICATION forming part of Letters Patent No. 383,426, dated May 22, 1888.

Application filed November 9, 1885. Serial No. 182,285. (No model.)

*To all whom it may concern:*

Be it known that I, WILLIAM B. MASON, of Boston, county of Suffolk, State of Massachusetts, have invented an Improvement in Fluid-Pressure Regulators, of which the following description, in connection with the accompanying drawings, is a specification, like letters on the drawings representing like parts.

My invention relates to a fluid-pressure regulator of that class in which a main valve controlling the flow of a fluid or any other device—such, for instance, as a furnace-damper or draft-valve—is governed in its operation in accordance with changes in pressure of a fluid having a variable pressure, the apparatus being adapted, for instance, for controlling a steam-pump in accordance with the pressure of the fluid forced by it, or being adapted for use as a pressure-reducing valve, by which the fluid which has passed through the valve is prevented from rising above a predetermined maximum pressure, whatever may be the pressure on the supply or inlet side of the valve.

In other applications, Serial No. 165,593, filed May 15, 1885, and No. 178,348, filed September 28, 1885, I have shown and described a fluid-pressure regulator in which the main valve or device is actuated by a differential piston, which, when it is to be moved in one direction, is exposed to pressure of the same intensity on both sides, and thus actuated by the difference in total pressures due to the difference in areas of the two parts of the piston, or, when the piston is to be moved in the other direction, the said pressure acts only on the smaller area.

The present invention is embodied in an apparatus in which the main actuating-piston has equal areas exposed to pressure in opposite directions, and the said pressure is at times removed from one side of the piston, leaving an unbalanced pressure on the other side, and at other times the pressure is made equal on both sides, leaving the piston free to be moved by any force other than that derived from the pressure of the fluid—such, for instance, as gravity or that of a spring. The admission of fluid under pressure to one side of the piston and its removal therefrom are effected by a secondary valve actuated by a piston or diaphragm in a pressure-chamber acted upon in one direction by a predetermined governing force derived from a weight or spring, and in the other direction by the pressure of the fluid, having a variable pressure, in accordance with which the main piston is to be operated.

Pressure-regulating devices especially intended for reducing-valves have been previously made, operating substantially the same as the apparatus of the present invention in the general particulars thus far described; but in the said apparatus the exhaust by which the pressure is removed from one side of the main piston is into the pressure-chamber, which thus communicates through the exhaust-passage with the space at one side of the main piston, and by passages leading from this space with interior of the pipe or duct controlled by the main valve. With this construction it is impossible to operate the secondary valve by a fluid of considerably greater pressure than that of the fluid controlled by the main valve, and it is generally objectionable to operate it by any fluid other than that which flows through the main valve, and such apparatus is intended to be operated only by the same fluid that flows through the main valve.

The invention consists in various details of construction, which will be hereinafter pointed out, by which the apparatus is simplified and its cost reduced, and the operation of applying it to the pipes or of taking it apart for examination and repairs greatly facilitated.

Figure 2:
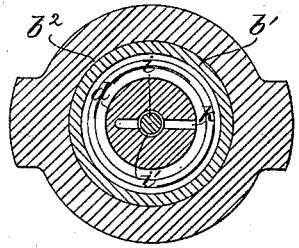

Figure 1 is a vertical section of a fluid-pressure regulator embodying this invention, and Fig. 2 a horizontal section thereof on line *x x*.

The main-valve shell *a*, having inlet and outlet openings $a'$ $a^2$, separated by a partition, $a^3$, having an opening, $a^4$, surrounded by a valve-seat, $a^5$, controlled by the valve proper, *b*, may be of any suitable or usual construction, the main valve *b* controlling the flow of any desired fluid from the inlet portion $a'$ and pipes connected therewith through the opening $a^4$ to the outlet-opening $a^2$ and pipes connected therewith. The apparatus will, for convenience, be described as standing in a vertical position with the valve above its seat, although it will operate in any position.

The main valve *b* is connected with or forms a part of a piston, *b'*, working in a cylinder or chamber, $b^2$, (shown as made integral with the valve-shell,) the said piston being constantly acted upon by the pressure of the fluid entering or passing through the main-valve shell at its under side, or acting in the direction to unseat the valve, and being provided with a small passage, $b^3$, through which the said fluid may flow slowly into the cylinder $b^2$ above the piston, so that if no escape is provided from the said cylinder the fluid will equalize the pressure above and below the piston, leaving it free to be moved downward by another force—such, for instance, as that of gravity acting upon it or that of an actuating-spring, $c$; but when an escape-passage is provided from the cylinder $b^2$ of considerably greater capacity than the inlet-passage $b^3$ thereto, the said fluid will escape without exerting any material pressure on the upper side of the piston, leaving the pressure on its under side practically unbalanced, and as said pressure is sufficient to overcome the weight of the piston and the force of the spring $c$ it will retain the piston in its uppermost position or the main valve open, as shown in the drawings.

The combination and mode of operation of the parts thus far described are not new, and are not herein broadly claimed.

The upper end of the cylinder $b^2$ is closed by a bonnet, $d$, which also forms a part of the pressure-chamber $e$, shown in this instance as completed by a diaphragm, $f$, secured at its edges between the bonnet $d$ and the base of the chamber $g$, supported thereon, the said chamber $g$ containing the spring $h$, or other device for producing the constant governing force that acts on the diaphragm $f$ in the opposite direction to the pressure of the fluid in the chamber $e$. The spring $h$ is confined between two plates, $h'$ $h^2$, and its force may be adjusted by an adjusting screw, $h^3$, working in the cap $g'$ of the spring-chamber $g$.

The middle portion of the diaphragm $f$, which is free to move vertically for a short distance in accordance with the varying forces acting on its upper and under sides, is connected with a rod or stem, $i$, having a working fit in a sleeve-like projection, $d'$, from the bonnet $d$, which is made long and extends down into the cylinder $b^2$, for the purpose of affording a long bearing on the stem $i$, enabling it to work easily, but to tightly close the passage in which it works, so as to prevent the passage of fluid between the cylinder $b^2$ and chamber $e$ in either direction.

The piston $b'$ is made long and hollow or cup-shaped to have a proper guidance in the cylinder $b^2$ and to receive the sleeve $d'$. The stem $i$ is connected or made integral with a secondary valve governing an exhaust-passage, $k$, (shown as extending transversely across the passage of the stem $i$,) which is provided with an annular groove, $i'$, that when in coincidence with the passage $k$ permits the flow of fluid through the said passage and across the stem-passage to the mouth $k'$ of the exhaust-passage $k$, which passes through the bonnet and valve-shell, as shown, the said mouth $k'$ being adapted to receive an exhaust-pipe, by which the exhaust-fluid may be conveyed to any desired point.

When the valve-stem $i$ is moved upward by the diaphragm $f$, (when the fluid-pressure in the chamber $e$ overcomes the governing force of the spring $h$,) so that the groove $i'$ no longer coincides with the passage $k$, the latter is closed or obstructed at the stem-passage, and the fluid can no longer escape from the cylinder $b^2$, so that it will enter through the passage $b^3$ until the pressure is the same above the piston $b'$ that it is below, when the said piston will be moved downward by its weight or by the spring $c$ until the valve $b$ is seated, preventing the further passage of fluid through the main-valve shell, and the main valve will remain seated until the pressure of the fluid in the chamber $e$ is reduced so that the governing force of the spring $h$ overcomes it, moving the diaphragm and connecting-stem $i$ downward until the groove $i'$ again coincides with the passage $k$, permitting the fluid to escape from the cylinder $b^2$, so that it acts unbalanced on the under side of the piston and raises it, overcoming the spring $c$.

The fluid, in accordance with the variable pressure of which the main valve is to be operated, is admitted to the pressure-chamber $e$ through an inlet-passage, $m$, in the valve-shell and bonnet, having its mouth $m'$ threaded to receive a suitable pipe, by which the fluid is conveyed to the pressure-chamber; and it will be seen that by having the inlet and exhaust pipes connected with the main-valve shell at $m'$ and $k'$ the bonnet $d$ may be removed at any time without disturbing any of the pipe-connections, and when thus removed the main valve and its piston may be withdrawn from the valve-shell, which is thus left connected with the pipes, while all the working parts of the apparatus are removed therefrom for the purpose of inspection or repair.

If the apparatus is to be used as a reducing-valve or the main valve to be controlled by the pressure of the fluid which has passed through it, the inlet-passage $m$ to the pressure-chamber may be connected by a passage, $m^2$, (indicated in dotted lines,) with the outlet portion of the main-valve shell, the mouth $m'$ then being closed.

In other pressure-regulating apparatus in which a main piston working in a cylinder is governed by a secondary valve operated by a piston or diaphragm in a pressure-chamber and controlling the exhaust from one side of the main piston the said exhaust has passed into the pressure-chamber and thus escaped through the inlet-passage to the pressure-chamber into the outlet part of the main valve, the exhaust-fluid thus mingling with the controlling-fluid in the pressure-chamber. By this construction it will be seen, first, that the pressure on the upper side of the piston cannot be lower than that in the pressure-chamber or outlet part of the main valve, and consequently the main valve cannot be opened until the pressure on the inlet side is greater than that on the outlet side of the main valve by an amount sufficient to overcome the weight of the piston and force of its actuating spring, while in accordance with the present invention the exhaust, being independent of the pressure-chamber, may be into the open air, or even into a vacuum, if necessary, so that practically the whole force of the fluid entering the main-valve shell is exerted to overcome the spring and open the main valve instead of merely the difference between the pressures on the inlet and outlet parts of the main valve.

It is also evident that the apparatus as formerly constructed could not be used for controlling a pump in accordance with the pressure of the pumped fluid whenever, as is frequently the case, the pressure of the pumped fluid is greater than that of the actuating-fluid. For instance, suppose steam at fifty pounds' pressure passing through the valve-shell $a$ were intended to actuate a pump against a water-pressure that might rise to one hundred pounds before the pump should be stopped. Then in the former construction the pumped water, entering the pressure-chamber $e$, would pass down through the exhaust-passage into the cylinder at the upper side of the main-valve-actuating piston, and as soon as this water-pressure became greater, or nearly as great as that of the steam, it would act in conjunction with the spring and the weight of the valve and close the valve against the steam-pressure, so that the pump would necessarily cease to operate as soon as the pressure of the pumped fluid became as great as that of the actuating-fluid, or even before, and, further than this, the pumped fluid would leak through the opening or passage in the main piston and mingle with the steam or actuating-fluid, which would be very objectionable. By the present invention, however, the pressure-chamber is made wholly independent of the cylinder in which the main-valve-actuating piston works, and thus may contain any desired fluid the pressure of which is to regulate the operation of the piston and main valve or any other device—such, for instance, as a damper or draft-regulator for a steam-generator, which may be actuated by a piston, such as the one $b'$ acted upon by such forces as described.

The small opening or leak through which the fluid passes into the cylinder above the piston is not necessarily made in the piston itself, but might be a passage in the valve-shell connecting the inlet side of the valve with the cylinder above the piston; or the piston might have a loose fit in the cylinder sufficient to let the fluid leak by it.

I claim—

1. In a fluid-pressure regulator, a piston and cylinder therefor, the said piston being constantly acted upon on one side by fluid-pressure, and provided with a small passage, through which the fluid passes into the cylinder at the other side of the said piston, combined with an exhaust-passage from the said cylinder, a secondary valve consisting of a rod having a longitudinal movement in a socket, and provided with a circumferential groove, the said valve controlling the said exhaust-passage, which intersects the said socket, and being actuated by a predetermined governing force and by an opposing variable pressure of a fluid in a pressure-chamber, substantially as described.

2. The main shell provided with a cylinder, and the cup-shaped piston working therein, combined with a bonnet for said cylinder having a sleeve-like projection passing down within the cylinder and piston, a pressure-chamber and diaphragm or equivalent therein, and a stem connected with the said diaphragm having a working fit in a passage in the sleeve-like projection, the said stem being provided with a valve controlling the exhaust of fluid from the said cylinder, substantially as described.

In testimony whereof I have signed my name to this specification in the presence of two subscribing witnesses.

WM. B. MASON.

Witnesses:
 JOS. P. LIVERMORE,
 H. P. BATES.